(12) United States Patent
Feigel et al.

(10) Patent No.: US 9,827,960 B2
(45) Date of Patent: Nov. 28, 2017

(54) BRAKE SYSTEM FOR MOTOR VEHICLES

(71) Applicant: Continental Teves AG & Co. oHG, Frankfurt (DE)

(72) Inventors: Hans-Jörg Feigel, Rosbach (DE); Daniel Widmann, Böblingen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/036,143

(22) PCT Filed: Nov. 13, 2014

(86) PCT No.: PCT/EP2014/074427
§ 371 (c)(1),
(2) Date: May 12, 2016

(87) PCT Pub. No.: WO2015/074935
PCT Pub. Date: May 28, 2015

(65) Prior Publication Data
US 2016/0272178 A1    Sep. 22, 2016

(30) Foreign Application Priority Data

Nov. 21, 2013   (DE) ........................ 10 2013 223 861

(51) Int. Cl.
*B60T 13/16*    (2006.01)
*B60T 8/40*    (2006.01)
(Continued)

(52) U.S. Cl.
CPC .......... *B60T 8/4081* (2013.01); *B60T 8/4013* (2013.01); *B60T 13/16* (2013.01); *B60T 13/686* (2013.01);
(Continued)

(58) Field of Classification Search
CPC . B60T 8/34; B60T 8/341; B60T 8/343; B60T 8/344; B60T 8/3675; B60T 8/368;
(Continued)

(56) References Cited

U.S. PATENT DOCUMENTS 9,145,119 B2    9/2015   Biller
9,205,821 B2   12/2015   Biller
(Continued)

FOREIGN PATENT DOCUMENTS

DE    102009048286      4/2011
DE    102012202645     10/2012
(Continued)

OTHER PUBLICATIONS

German Search Report for German Application No. 10 2013 223 861.4 dated Aug. 19, 2014, including partial translation.
(Continued)

*Primary Examiner* — Nicholas J Lane
(74) *Attorney, Agent, or Firm* — RatnerPrestia

(57) ABSTRACT

A brake system for motor vehicles, which can be actuated in a "brake-by-wire" operating mode both by the vehicle driver and independently of the vehicle driver. In the "brake-by-wire" operating mode the system can be operated in at least one fallback operating mode, with a brake master cylinder, actuated by a brake pedal, having a housing and two pistons, which delimit two pressure chambers, are assigned to brake circuits with wheel brakes, a pressure medium reservoir, one electrically actuable inlet valve per wheel brake for setting wheel-individual brake pressures, a first electrically controllable pressure provision device for loading the wheel brakes with pressure, and a second electrically controllable pressure provision device with at least one vacuum connector and a pressure connector, the vacuum connector is connected to the pressure medium reservoir. The pressure connector is
(Continued)

connected to at least one wheel brake without a valve being connected in between.

9 Claims, 1 Drawing Sheet

(51) Int. Cl.
*B60T 13/68* (2006.01)
*B60T 13/74* (2006.01)
*B60T 8/36* (2006.01)
*B60T 8/34* (2006.01)

(52) U.S. Cl.
CPC ............ *B60T 13/745* (2013.01); *B60T 8/341* (2013.01); *B60T 8/368* (2013.01); *B60T 2270/402* (2013.01); *B60T 2270/82* (2013.01)

(58) Field of Classification Search
CPC .... B60T 8/4013; B60T 8/4036; B60T 8/4081; B60T 8/42; B60T 8/44; B60T 8/4863; B60T 8/4872; B60T 8/5018; B60T 8/5031; B60T 13/16; B60T 13/18; B60T 13/20; B60T 13/168
See application file for complete search history.

(56) References Cited

U.S. PATENT DOCUMENTS

| | | |
|---|---|---|
| 9,205,824 B2 | 12/2015 | Feigel |
| 9,227,611 B2 | 1/2016 | Gilles |
| 9,315,180 B2 | 4/2016 | Jungbecker |
| 2007/0188015 A1* | 8/2007 | Sato ...................... B60T 8/4059 303/11 |
| 2007/0210642 A1* | 9/2007 | Niino .................... B60T 8/4081 303/11 |
| 2008/0036295 A1* | 2/2008 | Sakai ...................... B60T 8/368 303/116.4 |
| 2008/0048492 A1* | 2/2008 | Sakai ........................ B60T 8/26 303/113.1 |
| 2014/0028084 A1* | 1/2014 | Biller .................... B60T 8/4081 303/9.62 |
| 2014/0203626 A1* | 7/2014 | Biller .................... B60T 8/4081 303/10 |
| 2014/0225425 A1 | 8/2014 | Drumm |
| 2015/0028666 A1 | 1/2015 | Linhoff |

FOREIGN PATENT DOCUMENTS

| | | |
|---|---|---|
| DE | 102012205859 | 10/2012 |
| DE | 102012205860 | 10/2012 |
| DE | 102012205862 | 10/2012 |
| DE | 102011101066 | 11/2012 |
| DE | 102011122776 | 1/2013 |
| DE | 102012204263 | 9/2013 |
| WO | 2011029812 | 3/2011 |

OTHER PUBLICATIONS

International Search Report and Written Opinion of the International Searching Authority for International Application No. PCT/EP2014/074427 dated Jan. 27, 2015.

* cited by examiner

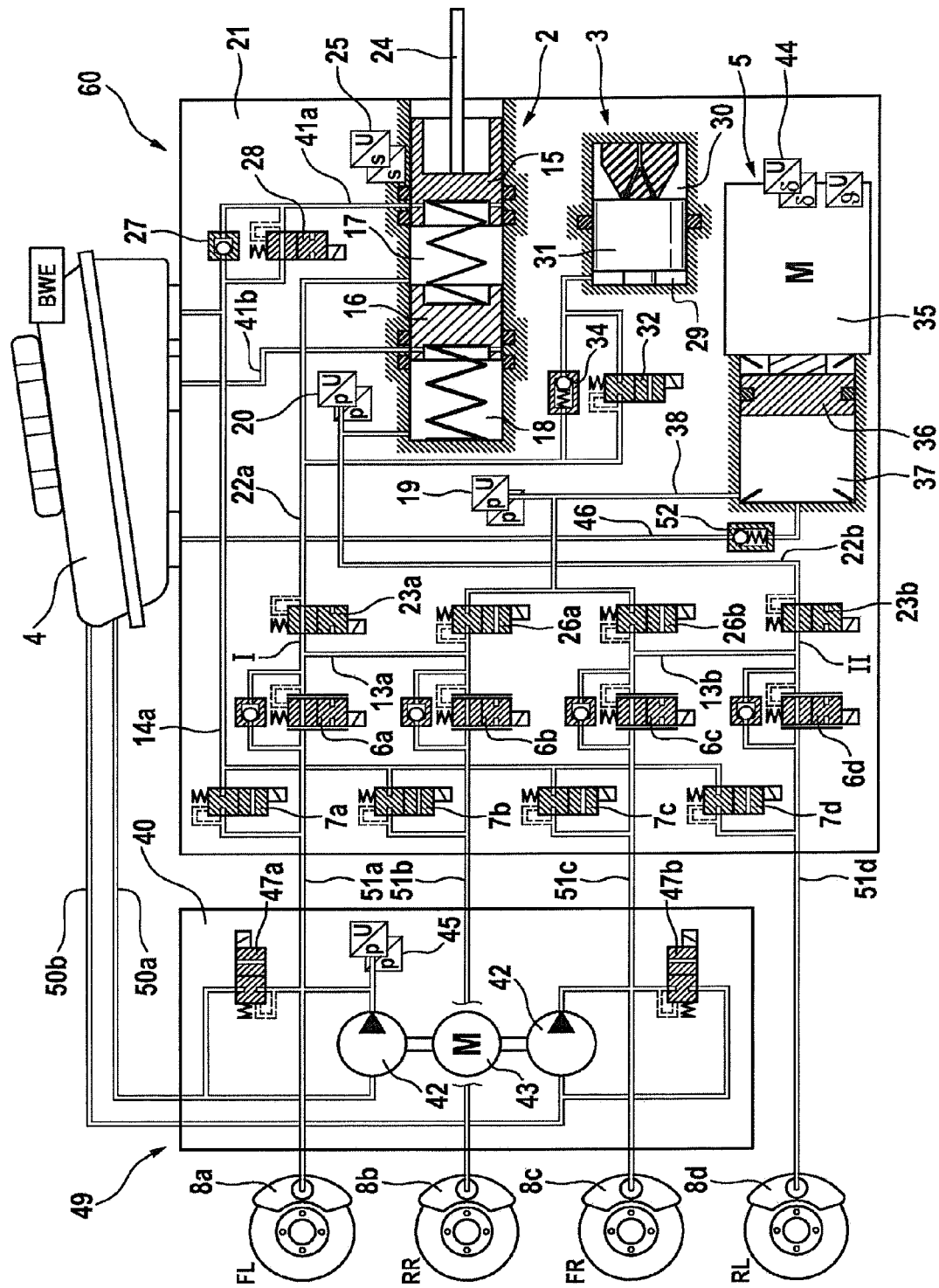

BRAKE SYSTEM FOR MOTOR VEHICLES

CROSS REFERENCE TO RELATED APPLICATIONS

This application is the U.S. National Phase Application of PCT International Application No. PCT/EP2014/074427, filed Nov. 13, 2014, which claims priority to German Patent Application No. 10 2013 223 861.4, filed Nov. 21, 2013, the contents of such applications being incorporated by reference herein.

FIELD OF THE INVENTION

The invention relates to a brake system for motor vehicles.

BACKGROUND OF THE INVENTION

Hydraulic vehicle brake systems are known which are in the form of power brake systems and which, in addition to a master brake cylinder which can be actuated by muscle force and to which wheel brakes are hydraulically connected and which provides the pressure and volume for the actuation of wheel brakes, comprise a further, electrically controllable pressure and volume provision device which actuates the wheel brakes in a "brake-by-wire" operating mode. In the event of failure of the electrically controllable pressure and volume provision device, an actuation of the wheel brakes is performed exclusively by way of the muscle force of the vehicle driver (non-boosted fallback operating mode).

WO 2011/029812 A1, which is incorporated by reference has disclosed an electrohydraulic brake system having a master brake cylinder which can be actuated by way of a brake pedal, having a travel simulator and having a pressure provision device. The wheel brakes are, in a "brake-by-wire" operating mode, charged with pressure by the pressure provision device. In the fallback operating mode, the wheel brakes are charged with the pressure imparted by the driver by way of the master brake cylinder that can be actuated by way of the brake pedal. In the case of the already known brake system, it has proven to be disadvantageous that, in the event of a failure of the actuation means or of the drive of the electrically controllable pressure provision device, large brake pedal travels and/or brake pedal forces have to be imparted by the driver in order to achieve adequate service braking deceleration.

DE 10 2012 205 862 A1, which is incorporated by reference describes a "brake-by-wire" brake system which, in addition to a master brake cylinder that can be actuated by way of a brake pedal, comprises a first and a second pressure provision device. The pressure ports of the second pressure provision device are connected to the input-side ports of the inlet valves of the wheel brakes, such that the inlet valves are arranged between the respective pressure port of the second pressure provision device and the wheel brake. Owing to the throttling action of the inlet valves, the pressure medium flow output by the second pressure source to the wheel brake can be impeded. Furthermore, the boosting module with the second pressure provision device is connected differently to the main module depending on arrangement and design, such that different variants and therefore cumbersome production concepts must be made available.

SUMMARY OF THE INVENTION

An aspect of the present invention aims to improve a brake system of the type mentioned in the introduction such that, even in the case of vehicles with a large pressure medium volume capacity of the brakes, the vehicle driver can perform a reliable braking action with comfortable brake pedal forces and brake pedal travels.

An aspect of the invention is based on the concept whereby, in addition to the first electrically controllable pressure provision device for the pressurization of the wheel brakes in the "brake-by-wire" operating mode, the brake system comprises a second electrically controllable pressure provision device which has at least one suction port and one pressure port, wherein the suction port is connected to the pressure medium reservoir and the pressure port is connected to at least one wheel brake without a valve being connected in between.

An advantage of an aspect of the invention lies in the fact that, by way of the second pressure provision device, a shortening of the brake pedal travel to be imparted by the vehicle driver and/or of the brake pedal force is achieved, such that, despite failure of the first pressure provision device, the vehicle driver can comfortably and reliably achieve an adequate service braking deceleration even in the case of large vehicles with a high pressure medium volume requirement.

A further advantage of an aspect of the invention lies in the fact that a pressure medium volume which is unlimited for practical applications is available for the second pressure provision device, because the or each suction port of the second pressure provision device is connected to the pressure medium reservoir, which is at atmospheric pressure.

A further advantage of an aspect of the invention lies in the fact that the pressure medium can be output by the second pressure source to the wheel brake in unimpeded fashion, for example without a throttling action of a valve.

The suction port is preferably connected to the pressure medium reservoir without a valve being connected in between. The suction port is particularly preferably connected directly to the pressure medium reservoir without a further hydraulic component being connected in between.

The pressure port is preferably connected to the wheel brake directly, that is to say without a valve being connected in between, or via a further hydraulic component.

The second pressure provision device is preferably, in hydraulic terms, of at least two-circuit design, wherein each of the pressure ports is connected to at least one wheel brake without a valve being connected in between.

In one aspect of the invention, the second pressure provision device comprises at least two hydraulic pumps which are driven jointly by one electric motor and which have in each case one suction port and one pressure port, wherein each of the pressure ports is connected to at least one wheel brake without a valve being connected in between. The suction ports of the first and of the second pump are particularly preferably connected to the pressure medium reservoir, advantageously without a valve being connected in between.

Each of the pressure ports of the first and of the second pump is preferably connected to precisely one wheel brake. The wheel brakes are particular preferably the wheel brakes of the front wheels.

The pressure port is advantageously connected to a connecting line between the wheel brake and the outlet-side port of the inlet valve.

To increase availability, the pressure ports of the first and of the second pump are connected to wheel brakes of different brake circuits.

For the first and the second pump, it is preferable for in each case one electrically actuable valve to be provided, which is connected in parallel with the pump. The valve is advantageously designed to be closed when deenergized. Alternatively or in addition, it is preferable for the valve to be of analogized design or to be designed to be actuated in analog fashion.

For the regulation of the additional pressure medium volume of the second pressure provision device, it is the case that, for the first and the second pump, in each case one electrically actuable valve, which is advantageously closed when deenergized, is provided, which valve is connected in parallel with the pump. Particularly precise regulation can be achieved by way of a valve which is analogized or actuated in analog fashion.

The brake system preferably comprises, for each brake circuit, an electrically actuable isolating valve, which is advantageously open when deenergized, for the hydraulic connection or separation of the master brake cylinder to or from the wheel brakes of the brake circuit. The isolating valve is in each case particularly preferably arranged in a hydraulic connecting line between the pressure chamber of the master brake cylinder and a brake circuit section which supplies pressure to the inlet valves and which can be pressurized "by-wire", and said isolating valve thus permits a selective closure or opening of the hydraulic connection between the pressure chamber and brake circuit section.

The brake system preferably comprises, for each brake circuit, an electrically actuable activation valve, which is advantageously closed when deenergized, for the hydraulic connection or separation of the first pressure provision device to or from the wheel brakes. The activation valve is particularly preferably arranged in each case in a hydraulic connecting line between the first pressure provision device and the brake circuit section and thus permits selective opening or closure of the hydraulic connection between first pressure provision device and brake circuit section.

The brake system preferably comprises a simulation device which imparts an acceptable brake pedal feel to the vehicle driver in the "brake-by-wire" operating mode. The simulation device is particularly preferably hydraulically connectable, by way of an electrically or mechanically actuable simulator enable valve, to at least one pressure chamber of the master brake cylinder.

A first electronic control and regulation unit is preferably designed for the actuation of the first electrically controllable pressure provision device in the context of regulation or control of the pressure that can be output thereby. Furthermore, the first control and regulation unit advantageously regulates or controls the isolating valves and activation valves and, if appropriate, a simulator enable valve of the brake system.

The brake system preferably additionally comprises an electrically actuable outlet valve for each wheel brake for the purposes of setting wheel-specific brake pressures.

The brake system preferably comprises one inlet valve and one outlet valve for each wheel brake for the purposes of setting wheel-specific brake pressures, said brake pressures being derived from the pressures of brake circuit pressures associated with the stated brake circuit sections, wherein the inlet valves, in the non-actuated state, transmit the brake circuit section pressure to the wheel brakes and, in the activated state, limit or prevent a wheel brake pressure build-up, and wherein the outlet valves, in the non-actuated state, prevent an outflow of pressure medium out of the wheel brakes into a pressure medium reservoir and, in the actuated state, permit and control such an outflow, wherein the inlet valves are closed, such that a wheel brake pressure build-up takes place.

The inlet valves and outlet valves are preferably actuated by the first electronic control and regulation unit. The inlet valves and outlet valves are particularly preferably arranged in a structural unit with the master brake cylinder, the first electrically controllable pressure provision device and the simulation device. It is furthermore advantageous if the isolating valves, the activation valves and the first electronic control and regulation unit are likewise arranged in the structural unit.

In one refinement of the invention, a pressure detection device is provided which detects the pressure-port-side pressure of the second pressure provision device, whereby monitoring of the brake circuit pressure is possible.

For the actuation of the second pressure provision device and for the evaluation of the output signals of the pressure detection device, the brake system preferably comprises a second electronic control and regulation unit.

The second pressure provision device, the pressure detection device and the second electronic control and regulation unit are preferably arranged in an independent assembly, such that a modular construction is realized, which simplifies the testability and installation of the brake system. Said assembly advantageously also comprises the valves connected in parallel with the second pressure provision device.

In order that, in the event of a failure of the on-board electrical system, a fallback operating mode with volume boosting can be maintained, the second pressure provision device, the pressure detection device and the second electronic control and regulation unit, particularly preferably the independent assembly, are preferably supplied with energy from an independent electrical energy source.

The first electrically controllable pressure provision device is preferably formed by a cylinder-piston arrangement, the piston of which can be actuated by an electromechanical actuator. An electrohydraulic actuator of said type operates in a particularly dynamic manner and very quietly and can easily tolerate the numbers of load changes required for brake systems.

The brake system furthermore preferably comprises at least one pressure sensor for detecting a pressure of the master brake cylinder. Furthermore, the brake system advantageously comprises a travel or angle sensor for the detection of a situation or position of the first pressure provision device and a travel or angle sensor for detecting a brake pedal actuation. At least the signals of the first three sensors mentioned are preferably processed by the first electronic control and regulation unit.

The invention claimed is:

1. A brake system for motor vehicles, which brake system can be actuated in a "brake-by-wire" operating mode both by the vehicle driver and independently of the vehicle driver, and can be operated in at least one fallback operating mode, the system comprising:
   a master brake cylinder which can be actuated by way of a brake pedal and which has a housing and two pistons which, in the housing, delimit two pressure chambers which are assigned to respective brake circuits with circuits, each of the brake circuits having a respective plurality of wheel brakes,
   a pressure medium reservoir,
   an electrically actuable inlet valve for each wheel brake, for the setting of wheel-specific brake pressures,
   a first electrically controllable pressure provision device for the pressurization of at least one of the plurality of wheel brakes of each of the brake circuits in the "brake-by-wire" operating mode, a simulation device which, in the "brake-by-wire" operating mode, imparts an acceptable brake pedal feel to the vehicle driver, and a second electrically controllable pressure provision device having at least one suction port and at least one pressure port, the suction port of which is connected, without a valve being connected in between, to the pressure medium reservoir, wherein the at least one pressure port of the second pressure provision device is connected to at least one of the plurality of wheel brakes of each of the brake circuits without a valve being connected in between.

2. The brake system as claimed in claim 1, wherein the second pressure provision device comprises at least two hydraulic circuits, wherein the at least one pressure port is provided for each of the at least two hydraulic circuits, and each pressure port is connected to the at least one of the plurality of wheel brakes of each of the brake circuits without a valve being connected in between.

3. The brake system as claimed in claim 2, wherein the second pressure provision device comprises at least two hydraulic pumps which are associated with respective ones of the at least two hydraulic circuits and are driven jointly by one electric motor and which have in each case one suction port and one pressure port, wherein each of the pressure ports is connected to the at least one of the plurality of wheel brakes of each of the brake circuits without a valve being connected in between.

4. The brake system as claimed in claim 3, wherein each of the pressure ports of the first and of the second pump is connected to precisely one of the plurality of wheel brakes of each of the brake circuits.

5. The brake system as claimed in claim 3, wherein for the first and the second pump, in each case one electrically actuable valve, which is closed when deenergized and/or is analogized or actuated in analog fashion, is provided, which valve is connected in parallel with the pump.

6. The brake system as claimed in claim 1, wherein the one or more pressure port(s) is/are connected to a connecting line between the wheel brake and the outlet-side port of the associated inlet valve.

7. The brake system as claimed in claim 1, wherein a pressure detection device is provided which detects a pressure port-side pressure of the second pressure provision device.

8. The brake system as claimed in claim 1, further comprising a first electronic control and regulation unit for the actuation of the first pressure provision device and a second electronic control and regulation unit for the actuation of the second pressure provision device, and of the valves, and for the evaluation of the output signals of the pressure detection device.

9. The brake system as claimed in claim 8, wherein the second pressure provision device is arranged in an independent assembly, wherein the assembly additionally comprises at least one of the pressure detection device, the second electronic control and regulation unit, and the valves.

* * * * *